Figure 7:
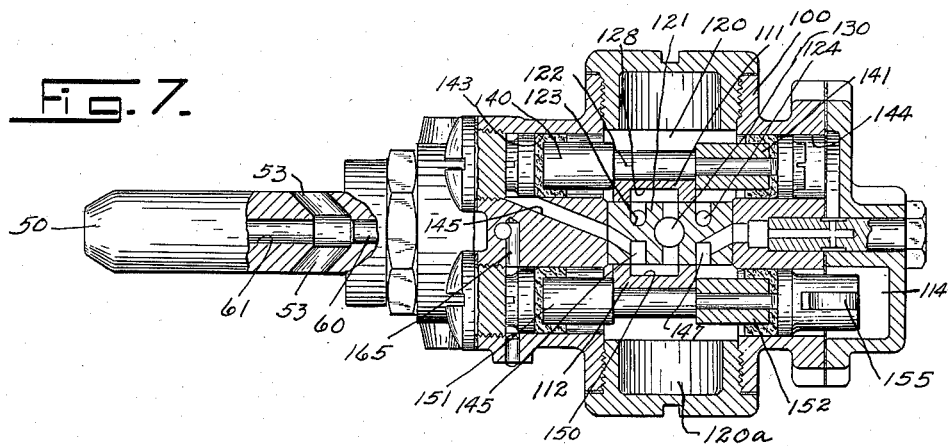

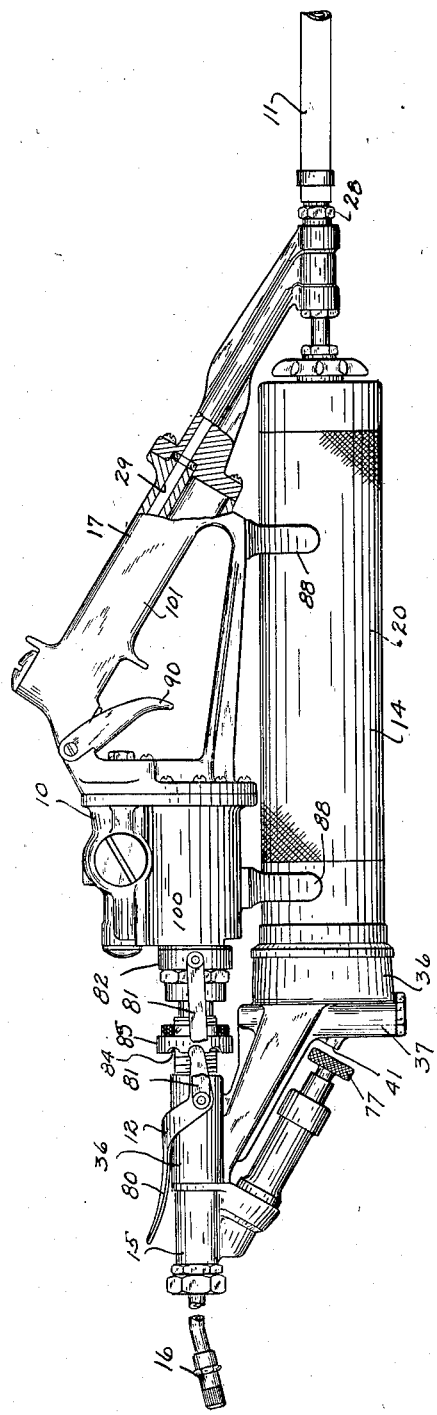

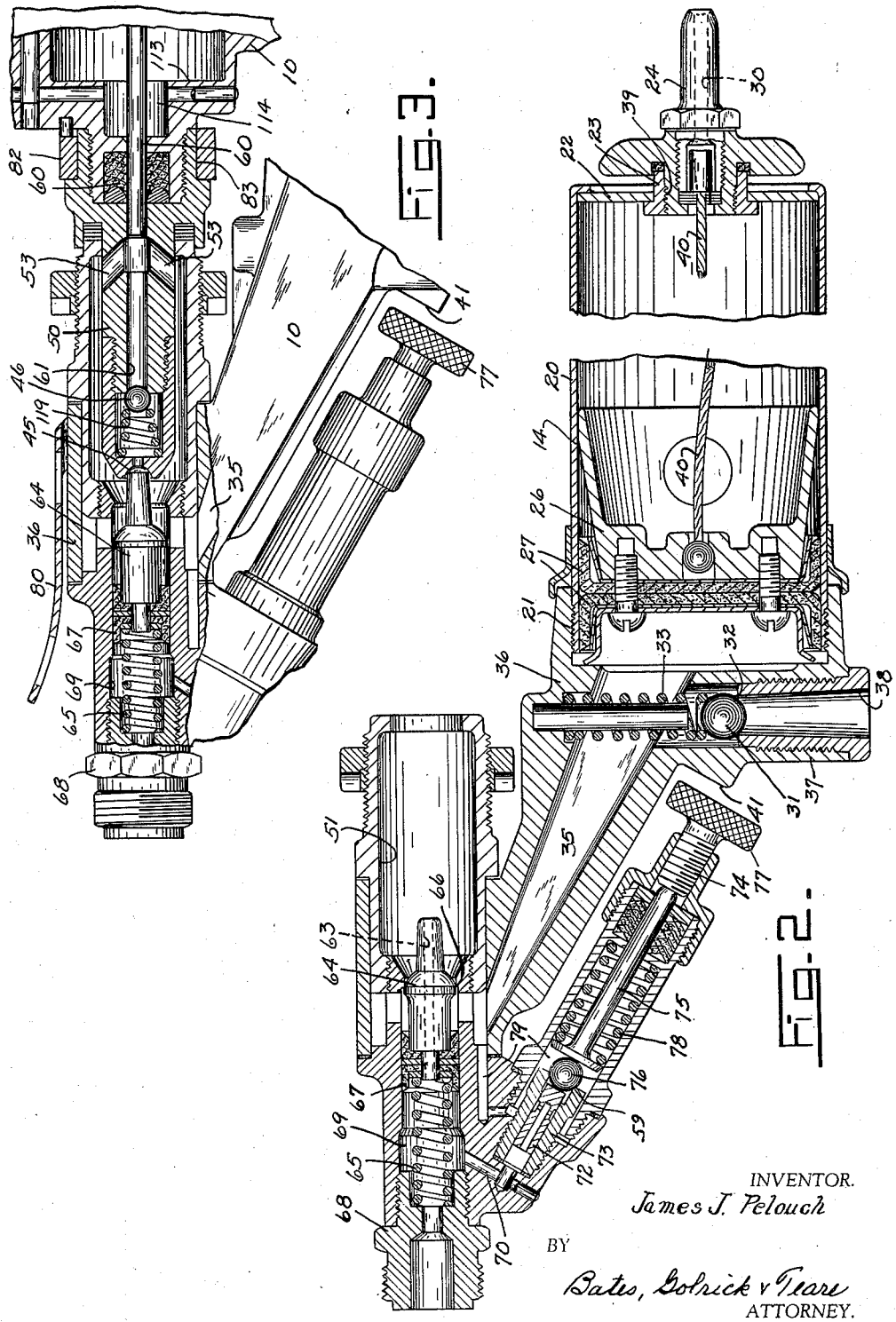

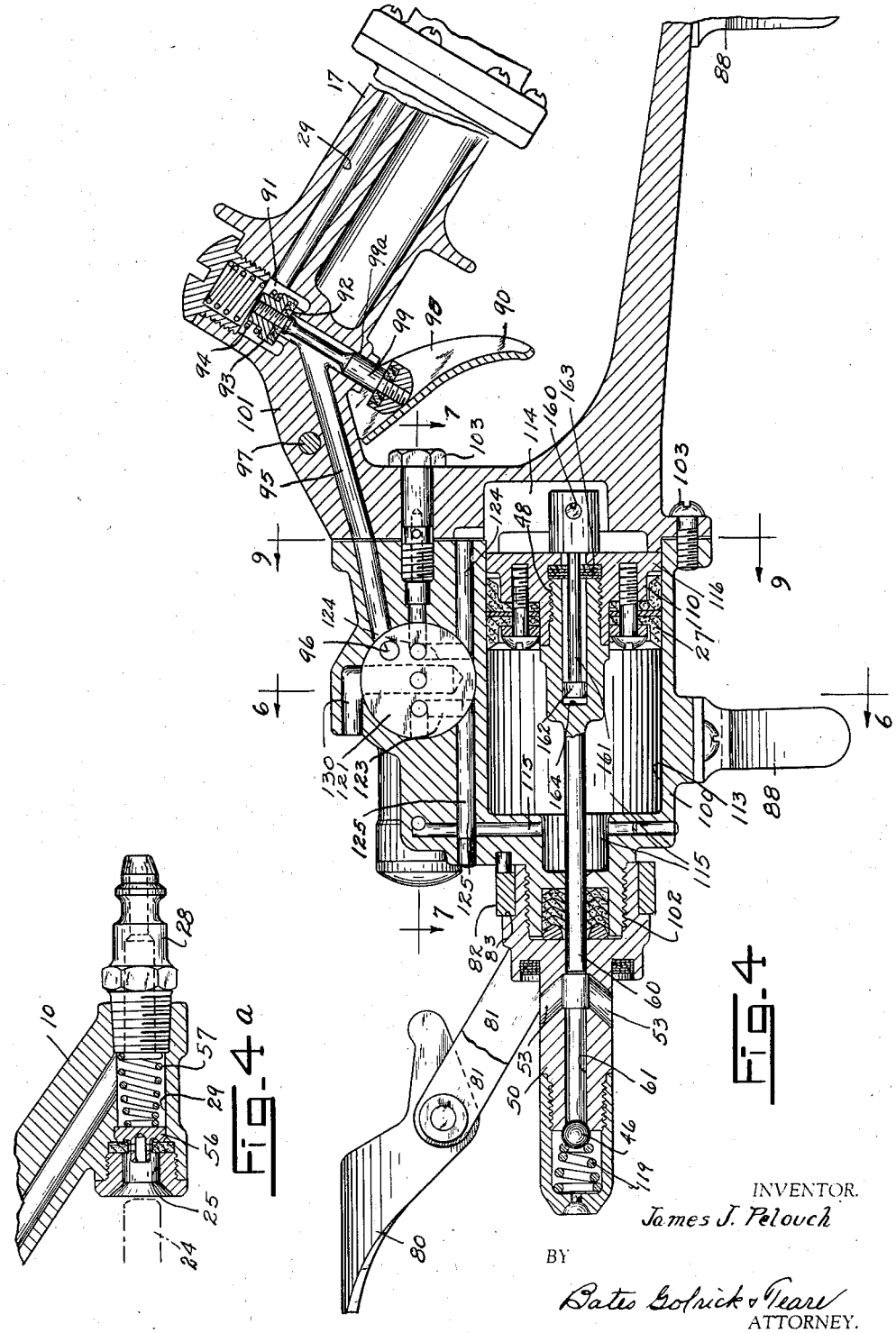

Dec. 14, 1937.   J. J. PELOUCH   2,102,025
GREASE GUN
Filed Feb. 23, 1935   5 Sheets-Sheet 4
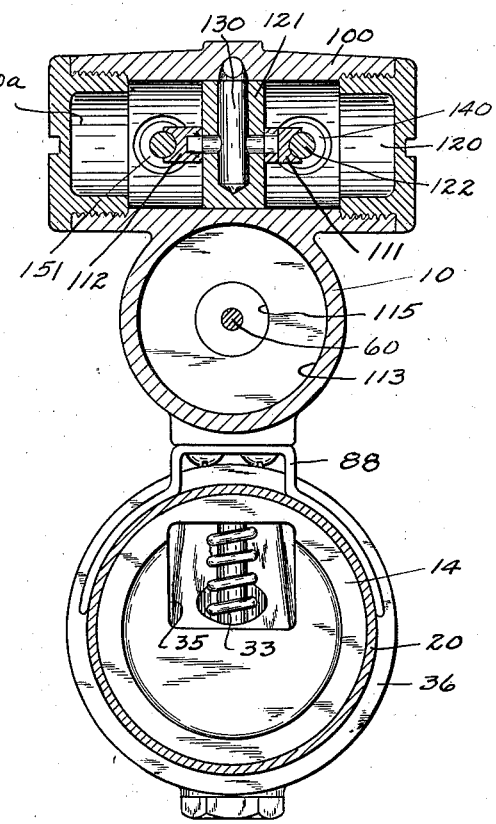
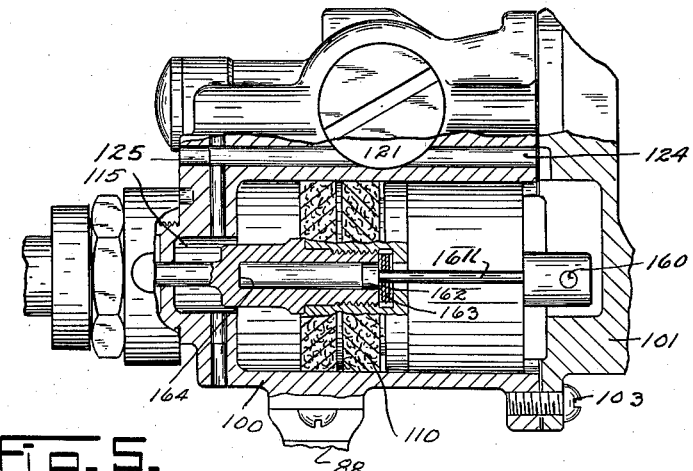
INVENTOR.
James J. Pelouch
BY
Bates, Goldrick & Teare
ATTORNEY.

Dec. 14, 1937.   J. J. PELOUCH   2,102,025

GREASE GUN

Filed Feb. 23, 1935   5 Sheets-Sheet 5

INVENTOR.
James J. Pelouch.
BY
Bates, Golrick & Teare
ATTORNEY.

Patented Dec. 14, 1937

2,102,025

UNITED STATES PATENT OFFICE 2,102,025

GREASE GUN

James J. Pelouch, Cleveland, Ohio, assignor to
The United States Air Compressor Company,
Cleveland, Ohio, a corporation of Ohio Application February 23, 1935, Serial No. 7,670

8 Claims. (Cl. 221—47.3)

This invention relates to a grease gun for lubricating automotive vehicles and other types of machinery, and is especially concerned with a pneumatically operated grease gun where a comparatively low air pressure line is connected to the gun and acts to force grease into a high pressure chamber, from which the grease is ejected under comparatively high pressure, obtained by an air motor, or piston operated by the low pressure. This, therefore, is the general object of the invention.

A more specific object is to provide a high pressure grease gun which is operated by a comparatively low pressure supply and wherein the operation of the high pressure mechanism is positive, that is, wherein the operation of the high pressure mechanism is not dependent on spring actuated mechanisms for its operation.

One of the features of the invention is the provision of a plurality of grease containers from any of which grease may be forced by low pressure, and each of which is so arranged as to be readily detachable from the high pressure mechanism to enable other containers with different grades of grease to be interchangeably used in the gun. The invention includes a quickly detachable clamping lock for making the connection between the grease container and the power unit. A grease ejector nozzle is carried by each grease container so that a minimum amount of grease is lost during interchange of grease containers. The invention further features the provision of suitable valve mechanism to prevent the loss of grease when a container is being removed from the high pressure mechanism.

The invention contemplates the provision of a grease container from which grease is ejected into a high pressure chamber by a comparatively low air pressure supply which is attached to the grease gun as by a suitable flexible conduit. The low air pressure is arranged to act on the grease in the container and force such grease into a high pressure chamber. A suitable plunger operated by a piston acts to force the grease from such chamber with comparatively high pressure due to the difference in areas between the plunger and the piston. The piston is operated in both directions by air pressure, such pressure being controlled by a pilot valve which is operated by the low pressure air. The position or operation of such pilot is controlled by a second pilot, which is mechanically operated by the piston, which forces the grease into the high pressure chamber. The construction is made compact by the use of a slide rod which is positioned concentrically within the piston to operate the mechanically operated pilot. These, therefore, are more specific objects of the present invention.

Other objects of the invention will become more apparent from the following description, reference being had to the preferred embodiment of the invention illustrated in the accompanying drawings. The novel characteristics of the invention will be set forth in the claims.

Figure 8:
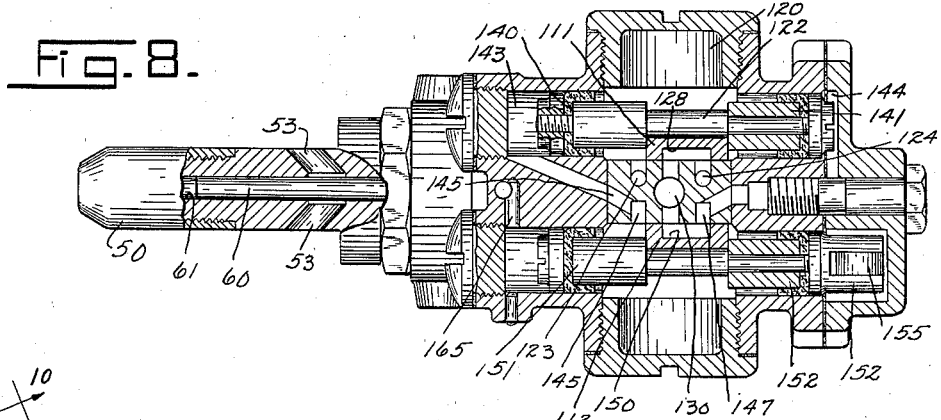
Figure 9:
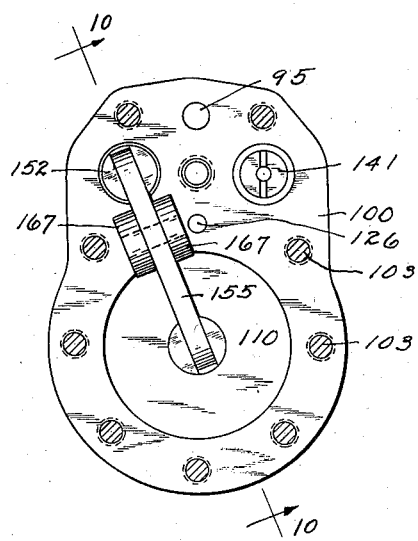
Figure 10:
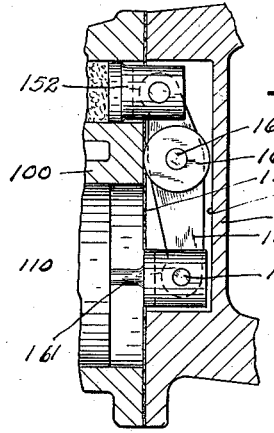

In the drawings, Fig. 1 is the side elevation of my improved grease gun, certain parts thereof being broken away to more clearly illustrate the internal construction; Fig. 2 is a central vertical section illustrating a grease container unit removed from the motor unit, the plane of the section being substantially parallel with the plane of Fig. 1; Fig. 3 is a fragmentary section, similar to Fig. 2, but illustrating the motor unit in position on the container unit; Fig. 4 is a vertical section, in substantially the same plane as Fig. 2, but illustrating the motor or power unit alone; Fig. 4a is a fragmentary section taken in the same plane as Fig. 4, but illustrating the low pressure connection to the power unit, such section being a continuation of the right-hand portion of Fig. 4; Fig. 5 is a fragmentary section taken in substantially the same plane as Fig. 4, but illustrating certain of the parts in a different operating position; Fig. 6 is a vertical transverse section, as indicated by the line 6—6 on Fig. 4; Fig. 7 is a horizontal section, the plane of the section being indicated by the line 7—7 on Fig. 4; Fig. 8 is a section similar to Fig. 7, but illustrating the parts in different operating positions; Fig. 9 is a vertical transverse section, as indicated by the line 9—9 on Fig. 4; Fig. 10 is a sectional detail, the plane of the section being indicated by the line 10—10 on Fig. 9.

Referring again to the drawings, it will be seen that my improved invention comprises a motor unit 10, which is connected with a suitable low-pressure air line 11, and which, by means of a quick detachable clamp 12, which is connected with the grease container unit 14, the latter unit carrying a grease ejector nozzle 15.

The grease container 14 comprises a tubular member 20, open at its forward end and threadingly secured, as at 21, to the body 36 of the nozzle member 15. The rear end of the tubular member is closed by a suitable disc 22, welded or otherwise secured to the walls of the tube, and to which is secured a bushing 23. The bushing 23 carries a connector 24 adapted to occupy a seat 25 in the motor unit 10, as shown in Fig. 4a.

Grease is normally contained within the container 20, forwardly of a piston or plunger 26, which, as shown in Fig. 2, is provided at its forward end with suitable washers 27, to prevent the seepage of grease to the rear of the piston.

The low pressure air line 11 is connected to the motor member 10 by suitable connector 28, which is provided with an air passageway leading to a passageway 29 in the motor member 10 and which communicates with the connector 24 of the grease container when the latter is in position on the motor unit. The connector 24 is provided with a suitable air passageway 30, which communicates with the interior of the cylindrical body 20, thereby permitting the air from the low pressure line to constantly act on the piston 26.

The grease container is so arranged that it may be readily refilled with a fresh supply of grease. As shown in Fig. 2, the body member 36 is provided with a downwardly extending boss portion 37, which is provided with an opening 38 adapted to communicate with the grease supply. When it is desired to refill the grease container by hand, the operator removes the container unit from the motor-unit, unscrews the container 20 from the body 36, and removes the connector member 24 by disengaging the threaded connection 39 from the bushing 23. Whereupon, by drawing the connector member rearwardly from the grease container by means of a suitable flexible cord 40, which interconnects the connector member 24 with the piston 26, the operator draws the piston rearwardly, thus causing grease to be drawn into the gun through the end of the container. Whenever one desires, however, to refill the container by means of a pump, he need not disconnect the container from the body 36, as in such case, grease may be introduced through the passageway 38 under sufficient pressure to unseat the valve 31. Normally, the valve 31 is urged to contact with its seat 32 by a compression spring 33.

The grease from the container is forced through a passageway 35, into a high pressure chamber 61, Fig. 3. This chamber is formed in an extension 50 of the motor unit 10, which extends into a cylindrical recess 51 of the ejector frame 36, whenever the grease container is in position on the motor unit. As shown in Fig. 3, the grease is forced through the passageway 35 and passes through the recess 51 and through suitable passageways 53 into the grease chamber 61, whereupon the plunger 60, which is slidably mounted in the high pressure grease chamber, is urged forwardly under comparatively great pressure to force the grease from the chamber 61 into the forward portion of the motor unit, and through a passageway 63, in a valve member 64 that is carried in the ejector nozzle 15.

When the container is in position on the motor unit, the valve member 64 is normally retained in the position shown in Fig. 3. However, whenever the grease container is removed from the motor unit, a suitable spring 65 urges the valve member 64 to coact with a seat 66 formed in the member 50, thereby closing the low pressure passageway 35 from the passageway 51. Suitable packing 67 carried by the valve member 64 prevents the escape of the high pressure from the nozzle member 68 into the low pressure passageways. The nozzle member 68 is secured to the forward end of the ejector 15, and is adapted to receive a suitable connector or coupling 16, arranged in the usual manner to be connected with the bearing to be lubricated.

The mechanism is so arranged that the pressure of the grease caused by the action of the plunger 60 may be regulated as desired. This enables the use of the gun where a bearing requires high pressure, as well as where the bearing requires a somewhat lower pressure, as for instance, spring shackle bearings and pump bearings, respectively. I prefer to secure this difference in pressure by providing a by-pass between the high-pressure grease passageway 69 in the ejector and the low pressure grease passageway 35.

As shown in Fig. 2, the pressure by-pass comprises a passageway 70, which communicates with the high-pressure passageway, and with a valve member 72. The valve member is slidably mounted in a casing 73, which is secured to the body member 36. When the grease gun is used for maximum pressure, the valve is retained in the position shown in Fig. 2 by a suitable thumb screw 74. As shown, the thumb screw 74 abuts a plunger 75 which in turn forces a ball 76 against a seat 59 in the casing 73, thereby holding the valve 72 in closed position by direct pressure.

When it is desired to use the gun for a less pressure, the thumb screw 74 is turned to a position where the head 77 thereof seats against a shoulder 41 formed on the frame member 36, whereupon the high pressure of the grease acts to slide the valve plunger 72 rearwardly against the action of a compression spring 78, which encircles the plunger 75. When the grease pressure exceeds that of the spring 78, a passageway 42 in the valve 72 is brought into communication with a passageway 79 which communicates with the low-pressure grease passageway 35, heretofore mentioned.

Hence, it will be seen that I readily adapt the gun for use with bearings which require comparatively high pressure or bearings which require somewhat less pressure. In the first instance, the pressure is the maximum pressure possible due to the action of a plunger 60 of the motor unit, while in the second instance the pressure is limited to that required to overcome the compression of the spring 78.

When the gun is in operation, the valve member 64, heretofore mentioned, is urged from its seat by the forward end 50 of the motor unit 10. As shown in Fig. 3, the valve member 64 coacts with a conical recess 45 formed in the forward end of the member 50. The grease under high pressure, due to the action of the plunger, is forced past a check valve 46, through the passageway 63 in the valve member to the chamber or passageway 69. This places high-pressure grease on the nozzle end of the packing unit 67, and as this unit is considerably larger in diameter than that portion of the valve which coacts with the conical seat 45, the pressure of the grease itself maintains the valve member in contact with the motor unit, irrespective of the action of the spring 65.

The motor unit 10 comprises, as shown in Fig. 4, a series of frame or body members 50, 100 and 101, which are secured together by threaded connections, such as 102, and suitable bolts 103, to form a unitary member, which houses the plunger 60, heretofore described, a low pressure piston 110, and a pair of pilot valves 111 and 112 (Fig. 7).

The high pressure grease plunger 60, as heretofore mentioned, is slidably mounted in an axial passageway or high pressure grease chamber 61. The plunger is preferably threadingly connected as at 48, with the piston 110, which is mounted in a cylindrical recess 113 in the frame member 100. A suitable air passageway or chamber 114 at the rear of the piston and a passageway or chamber 115 at the forward end of the cylinder permits the low-pressure air to enter the cylinder 113 at either end of the piston. Such pressure is controlled by the pilot valve 111, hereinafter to be more fully described.

As shown in Fig. 4, the piston 110 is provided with the usual skirt 116, together with suitable washers 27 to maintain a tight connection between it and the walls of the cylinder 113. The arrangement is such that consequent upon the admission of low-pressure air to the chamber 114, the piston will be forced forwardly, whereupon the plunger 60 forces grease from the high-pressure grease chamber 61 past the spring check 46 and through the passageways 63 and 69, heretofore described, into the connecting members which removably connect the gun with the bearing to be lubricated.

When the piston 110 has reached its forward stroke, the air pressure behind the piston, in the chamber 114, is released and pressure is admitted into the chamber 115 at the forward faces of the piston, whereupon the piston is drawn rearwardly, causing the plunger to be moved to the position shown in Fig. 4. While the plunger is in this position, low pressure grease is forced through the passageways 53 into the grease chamber, the check 46 being forced into engagement with its seat as soon as the plunger 60 starts to withdraw, due to the action of high pressure grease and a suitable compression spring 119.

The flow of the low-pressure air to the forward and rear faces of the piston 110 is controlled by the pneumatically operated pilot valve 111. The pilot 111, as shown in Fig. 7 is located in a chamber 120 in the frame member 100, and above the cylinder 113. This pilot comprises a sliding valve block which is maintained in position against a stationary valve block 121, by a plunger 122, together with the low pressure air which is connected with the chamber 120 whenever a suitably manually operated valve mechanism 90, hereinafter to be described in detail, is operated. The stationary valve block 121 is provided with a passageway 123, which communicates with a passageway 125, the latter communicating with the chamber 115 at front of the piston 110. The stationary block also has a secondary passageway 124 which communicates with the passageway 126 which in turn communicates with the chamber 114 at the rear of the piston 110.

When the pilot valve 111 is in the position shown in Fig. 7, a slotted opening 128 in the valve 111 brings the passageway 123 into communication with an opening 130 in the stationary valve block 12, the latter opening, as shown in Fig. 4, leading to the exterior of the housing 100, thereby relieving the pressure in the chamber 115 ahead of the piston 110. When the pilot valve 111 is in the position just described, the passageway 124 of the stationary valve block is in direct communication with the chamber 120. Therefore, low pressure air is supplied to the rear of the piston 110, causing the piston to be forced forwardly to eject the grease from the high pressure chamber.

As the piston reaches the forward end of its stroke, the position of the pilot valve 111 is moved to the position shown in Fig. 8. As shown in Fig. 7, the pilot valve 111 is gripped between enlarged end portions 140 and 141 of the plunger 122. Hence, as the plunger moves from one direction to the other, it carries with it the pilot valve. The enlarged portions 141 and 142 of the plunger 122, act as pistons, which are arranged to slide in cylinders 143 and 144, respectively, the cylinder 143 being in communication with a passageway 145 in the valve block 121, while the cylinder 144 is in communication with the passageway 147 in the opposite face of the valve block 121.

When air is admitted to the passageway 144, the pilot 11 will move to the position shown in Fig. 7, in which position the low pressure air enters the chamber 114 to the rear of the piston 110, causing the grease to be ejected from high pressure chamber. When, however, air enters the air passageway 145 to supply air to the chamber 143, the plunger will be moved rearwardly to the position shown in Fig. 8, wherein the pilot valve 111 brings the passageway 124 of the chamber 114 of the piston into communication with the exhaust passageway 130 of the slide block and opens the passageway 123 to the air pressure within the chamber 120, thereby applying air pressure through the passageway 125 to the chamber 115 at the rear of the piston 110, causing the piston to be drawn rearwardly.

The position of the pilot valve 111 is controlled by a second pilot 112, heretofore mentioned. This pilot, however, in distinction to the pilot 111, is mechanically operated, rather than pneumatically and is dependent upon the movement of the piston 110. As shown, the pilot 112 is similar to the pilot 111 and has a slotted opening 150 adapted to connect either the passageway 145 or the passageway 147 with the exhaust passageway 130, thereby selectively placing air pressure at one end of the plunger 122 and relieving the pressure at the other end. The arrangement is such that the slide valve 112 is periodically moved from one position to the other, so as to reciprocate the valve 111, which in turn controls the reciprocation of the piston 110.

The pilot valve 112 is embraced between two boss-like portions 151 and 152 of a plunger 153, which boss-like portions are arranged to act as pistons, as will be hereinafter more fully explained. The pilot is operated by the piston 110. As shown in Figs. 7 to 10 inclusive, the rearmost piston 152 of the plunger is pivotally connected to one end of a rock arm 155, which is carried intermediate its end by a pin 166 to which is secured discs 167, coacting with the adjacent walls 158 and 159 in the frame members 100 and 101, respectively, and which act as pivots for the rock arm 155. The other end of the rock arm is pivotally connected by a pin 169 to a rod 161, which is slidably mounted in the piston 110.

As the piston 110 reaches the forward end of its stroke, an enlarged head 162 of the rod 161 is engaged by suitable washers 163, which are gripped between the plunger 60 and the piston 110, drawing the rod 160 forward and causing the rock arm 165 to draw the plunger 153 rearwardly, thereby changing the pilot 112 from the position shown in Fig. 7 to the position shown in Fig. 8. This admits air to the forward end of the plunger 122, and moves it to the position shown in Fig. 8, admitting air to the forward side of the piston 110.

When the piston 110 nears the rearmost limit of its stroke, the head 162 of the rod 160 is engaged by the forward end of its guideway 164. Further movement of the piston then rocks the arm 155 causing the plunger 122, together with the pilot valve 111, to move from the position shown in Fig. 8 to the position shown in Fig. 7. Consequently low-pressure air is applied to the rear chamber 114 of the piston 110, causing it to move forwardly.

The plunger 153 is so arranged that air pressure acts to maintain it in its end-most positions. The mechanical operation of such plunger by the piston 110 overcomes the action of air pressure, which is controlled by the pilot 111. As shown, the plunger 153 has enlarged piston-like portions 151 and 152 at either end thereof, the forward end of the plunger 153 communicating through a passageway 165 with the passageway 125 and the forward chamber of the piston 110. Hence, when the pilot 112 has been moved to the position shown in Fig. 8, by the piston 110, and consequently caused the pilot 111 to be moved to the position shown in that figure, air pressure is admitted through the passageway 165 ahead of the piston 151, thereby retaining the pilot in such position.

When the piston 110 reaches its rearmost stroke and, through the rock arm 155, moves the pilot 112 forwardly, that is, to the left in Fig. 8, into the position shown in Fig. 7, the pilot valve 111 moves from the position shown in Fig. 8, to that shown in Fig. 7. This exposes the passageway 165 which communicates with the passageway 125 to atmospheric pressure, thereby relieving the pressure at the forward end of the piston 151. Simultaneously the operation of the pilot valve 112 causes the air pressure to enter the chamber 114 to the rear of the piston 110, and as this chamber communicates with the piston 152, it will cause the pilot 112 to remain in the position shown in Fig. 7.

As heretofore mentioned, the supply of air to the motor 10 is controlled by a manually operable valve 90. This valve is best illustrated in Fig. 4. As there shown, the passageway 29 extends from the air supply line 11 to a chamber 91 at the forward end of a handle portion 17 of the member 101. The chamber is provided with a valve seat 92 against which a valve 93 is normally positioned by a suitable compression spring 94. The valve 93 controls the passage of air pressure from the passageway 29 to passageways 95 and 96, which communicate with the chambers 120 and 120a which house the pilots 111 and 112 respectively.

The valve 93 is operated by a lever 98, which is pivoted to the body 101, as at 97, and engages a stem 99, of the valve 93, which stem is slidably mounted in a suitable guideway 99a in the body member and is secured to the valve 93 by suitable threads.

To enable various container units carrying various grades of grease to be used with one motor unit, the container units are readily detachable from the motor unit. It will be noted that this detachment is readily made without disturbing or cutting the air supply to the tool. As shown in Fig. 4a the air passageway 29 is supplied with a check valve 56, which when the container unit is in position, is forced from its seat by the connector member 24 of such unit. However, as a container unit is removed, a spring 57 forces the check valve against its seat cutting the flow of air.

The grease container units are removably clamped into position on the power unit by a clamp mechanism 12 which is quickly and readily adjusted by the operator. As shown in Figs. 1 and 4, the clamp comprises a yoke shaped operating member 80 which is connected by a pair of links 81 to opposite sides of a collar 82 which seats in an annular 83 in the motor frame member 50. The links 81 are connected to the yoke intermediate its ends, the arrangement being such that, as the ends of the yoke are placed in suitable sockets 84 in an adjustable clamping rim 85 on the container unit, and the yoke rocked about such sockets, the container unit will be drawn into close contact with the motor unit. As the pivotal connection between the yoke and the links is arranged to be swung beyond a plane intersecting the sockets and the pivotal connection between the links and the collar 82, the yoke will be locked in position, further movement being restricted by contact between the yoke and the body member 36 of the container unit.

I claim:—

1. A grease gun, comprising in combination, a container, discharge conduit means attached thereto and leading to the ultimate point of discharge from the gun, means for conducting air under pressure to the container so as to expel lubricant therefrom at a predetermined pressure, a power-unit detachably connected to the container, an air-operated booster pump carried in its entirety in the power unit, a valve carried by the container adjacent the point of connection between the container and power unit, means for normally holding the valve closed when the power unit is disassociated from the container, and means for opening said valve automatically whenever the unit is connected to the container.

2. A gun of the class described, having low-pressure forcing unit including a reservoir and discharge conduit means therefor, said means having an outlet for the material forced by the low-pressure unit, a high-pressure forcing unit comprising a pneumatically operated booster pump having a high-pressure chamber communicating with the discharge means of the low-pressure unit intermediately of its effective ends whereby both units discharge material through said outlet, the high-pressure unit being detachably associated with the low-pressure unit at the point of communication between said high-pressure unit and the discharge conduit means.

3. A grease gun, having a low-pressure unit including a lubricant reservoir and discharge means therefor terminating in a fitting adapted for attachment to an external applicator tube or the like, a high-pressure unit comprising a pneumatically operated booster pump having a high-pressure chamber communicating with the discharge means of the low-pressure unit so that both units discharge lubricant through said fitting, the high-pressure unit being detachably associated with the low-pressure unit without disturbing the operative unitary character of the latter unit.

4. A device of the class described, comprising in combination, a lubricant container, and a power unit, detachably associated with each other, air operated means to eject lubricant from the container to the power unit, a valve carried by the container and interposed between the container and the power unit, means for normally holding the valve on its seat to prevent the flow of lubricant to the atmosphere so long as the container and power unit are disconnected, air passageways between the power unit and the container, a valve interposed in said passageways, means for normally holding said last-named valve on its seat to prevent the flow of air to the atmosphere, so long as the container and power unit are disconnected, means for automatically opening both of said valves, consequent upon the attachment of the container to the power unit, and a discharge conduit arranged to carry lubricant from the container and from the power unit, said conduit being unitary with the container and detachable from the power unit therewith.

5. In combination, a low pressure unit comprising a lubricant container having a hollow discharge valve and having a nozzle associated therewith, means operating normally to prevent the flow of lubricant through the nozzle, a high pressure power unit detachably connected to the low pressure unit and having means thereon for automatically opening said valve whenever the two units are interconnected, an air supply control valve associated with the high pressure unit and mechanism for automatically actuating the power unit continuously so long as the air supply means is held in open position and to discharge lubricant through said hollow valve.

6. A power unit for a lubricant gun, comprising a cylinder, a plunger movably mounted therein, a second cylinder in alignment with the first cylinder, a piston movable in the second cylinder and attached to the plunger, conduits for conducting air under pressure to opposite sides of said piston, a slide valve, a rod coaxial with the piston for controlling the slide valve, a pneumatically actuated valve controlled by the first named valve, the pneumatic valve operating in turn to control the flow of air to the second named cylinder and both of said valves acting conjointly to reciprocate the piston continuously so long as air under pressure is supplied thereto.

7. A power unit for a lubricant gun, comprising a cylinder, a plunger movably mounted therein, a second cylinder in alignment with the first cylinder, a piston movable in the second cylinder and attached to the plunger, a conduit for conducting air under pressure to opposite sides of said piston, a manually operable valve in said conduit for controlling the flow of air to the unit, a mechanically actuated valve having a lost motion connection with the piston, said connection including a single member that is mounted inside the piston and coaxial therewith, a pneumatically actuated valve controlled by the mechanically actuated valve, the pneumatically actuated valve operating in turn to control the flow of air to the second named cylinder and both of said pneumatically and mechanically actuated valves acting conjointly to reciprocate the piston continuously so long as the manually operable valve is held in open position.

8. A grease gun comprising in combination, a container having a piston therein for ejecting lubricant therefrom, a casing projecting from the container and having a high pressure chamber therein, a discharge conduit attached to the casing adjacent the high pressure chamber, a discharge valve carried by the casing and separating the low and high pressure chambers, a power unit detachably connected to the casing, and means carried by the power unit for unseating the valve when the connection is made between the power unit and casing, said valve having a passageway therethrough by means of which lubricant is admitted from the low to the high pressure chamber.

JAMES J. PELOUCH.